Sept. 29, 1931. G. FRANCYK 1,825,516
SAWING MACHINE
Filed July 19, 1929
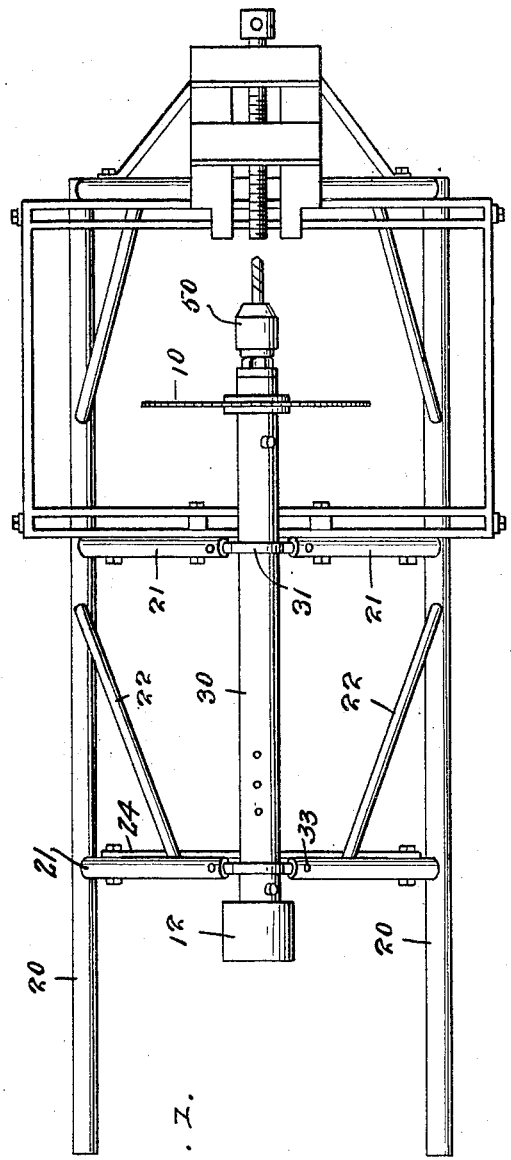
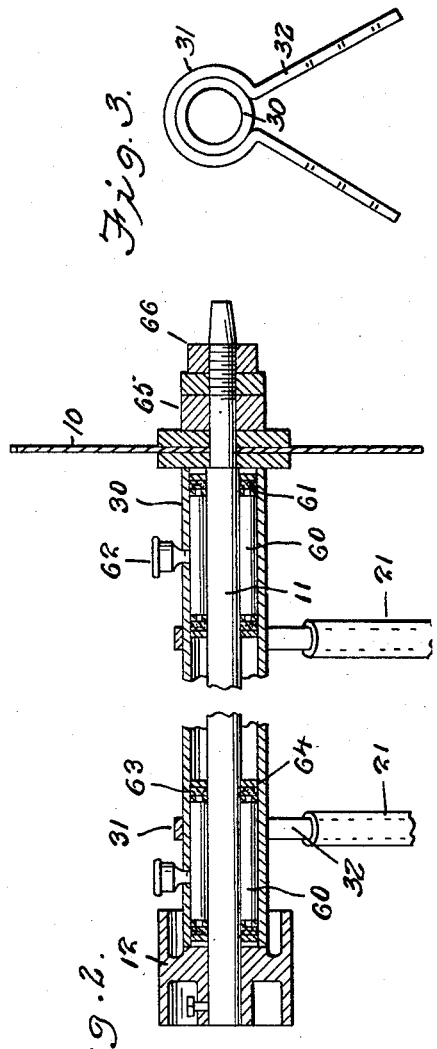
George Francyk
INVENTOR
BY Victor J. Evans
ATTORNEY Patented Sept. 29, 1931

1,825,516

UNITED STATES PATENT OFFICE

GEORGE FRANCYK, OF AKRON, OHIO

SAWING MACHINE

Application filed July 19, 1929. Serial No. 379,477.

The object of this invention is to provide special means for mounting a saw shaft with reference to a supporting frame, said shaft being provided with a tubular housing, and the housing being supported for adjustment vertically with reference to a main frame.

A further object is to provide for the tilting of the shaft in a vertical longitudinal plane, so that cuts may be made by the saw, at different angles.

In the drawings—

Figure 1 is a view showing the construction in top plan; Figure 2 is a longitudinal section through the housing of the saw shaft; Figure 3 is a detail view showing a forked element, or yoke frame, for partly inclosing the shaft housing, and adapted to be mounted to permit of change in the position of the shaft and housing.

The main frame is assumed to include parallel side members 20, which may rest on the ground, and extending upwardly and inwardly from elements 20 are tubular frame members 21 braced by inclined braces 22, suitably connected as by welding with members 20. Transverse tie bars 24, of any suitable material and number, are connected with tubes 21.

Yoke frames for supporting the shaft housing 30 each include an upper central portion 31 and diverging legs 32 adjustable by means of bolts or pins 33 in tubes 21. The minor frames shown include elements 21, 22 fixed only at their outer portions, and subject to yielding movement under pressure. The inner portions of tubes 21 will move upwardly or downwardly to a sufficient extent for adjusting the saw shaft housing, when the pins 33 are shifted to a new position. Moreover, the legs 32 of light weight material are especially subject to resilient or yielding movement, and the portions thereof adjacent to the yoke 31 will approach or spread slightly as determined by the movement of the shaft housing upwardly or downwardly.

When changing the angle of the shaft housing, sufficient torsion or twisting movement will be permitted by the yoke frames and the frame construction 21, 22, to effect slight tilting of the shaft housing. Well known types of metallic construction of this character are subject to flexing or warping.

The saw 10 is rigid with shaft 11 driven by pulley wheel 12, and the shaft extends through the housing 30, being provided with roller bearings 60 mounted at 61 and lubricated from grease receptacles 62. Felt washers 63 are retained by annular elements 64, and restrict the zone of lubrication. The saw may be retained by washers 65 and lock nut 66 (Figure 2)—a tool chuck 50 appearing in Figure 1 on the shaft 11.

In this case the mounting of the saw shaft housing is emphasized, and

What I claim is—

1. In a device of the class described, a main frame, including lower frame elements, a saw shaft and saw, a housing for the shaft, a plurality of yoke frames each including an upper central portion surrounding and suspending the housing, and including downwardly and outwardly extending legs, and means for supporting said legs by the lower elements of the main frame.

2. In a device of the class described, a structure comprising the elements of claim 1, assembled as there specified, and devices for effecting adjustable connection between the legs and the supporting means for the legs.

3. In a device of the class described, a structure comprising the elements of claim 1, assembled as there specified, said legs having slidable connection with the supporting means for the legs, and devices for independently connecting each leg with its supporting means, permitting adjustment of the legs in pairs for tilting the shaft.

In testimony whereof I affix my signature.

GEORGE FRANCYK.